United States Patent
Wei et al.

(10) Patent No.: US 7,446,492 B2
(45) Date of Patent: Nov. 4, 2008

(54) FAN SYSTEM AND STOPPING METHOD FOR MOTOR THEREOF

(75) Inventors: Chia-Pin Wei, Taoyuan Hsien (TW); Yi-Lun Chen, Taoyuan Hsien (TW); Wei-Shuo Tseng, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 161 days.

(21) Appl. No.: 11/603,181

(22) Filed: Nov. 22, 2006

(65) Prior Publication Data
US 2007/0126381 A1      Jun. 7, 2007

(30) Foreign Application Priority Data
Dec. 2, 2005    (TW)    .............................. 94142389 A

(51) Int. Cl.
*H02P 7/00* (2006.01)
(52) U.S. Cl. ................... 318/275; 318/563; 388/903
(58) Field of Classification Search ............... 318/139, 318/275, 563, 565, 798; 388/903
See application file for complete search history.

(56) References Cited

U.S. PATENT DOCUMENTS

| | | | | |
|---|---|---|---|---|
| 4,169,990 A | * | 10/1979 | Lerdman | ................ 318/400.41 |
| 4,734,627 A | * | 3/1988 | Koerner | ................ 318/400.21 |
| 6,758,788 B2 | * | 7/2004 | Itou | ............................. 477/8 |
| 6,812,586 B2 | * | 11/2004 | Wacknov et al. | .............. 290/52 |

* cited by examiner

*Primary Examiner*—Rina I Duda
(74) *Attorney, Agent, or Firm*—Birch, Stewart, Kolasch & Birch, LLP

(57) ABSTRACT

A fan system and a stopping method for the fan system are provided. The fan system is electrically connected to a power supply and receives the power therefrom. The fan system includes an energy storage apparatus, a motor and a start-up device. The energy storage apparatus receives and stores the power. The motor is electrically connected to the energy storage apparatus and receives the power. The driver is coupled between the energy storage apparatus and the motor to form a control path and generates a driving signal to the motor according to received power. The start-up device is coupled between the energy storage apparatus and the motor to form a power path therewith. When no power is provided to the fan system, the energy storage apparatus releases the stored power and the start-up device generates a start-up signal to the motor in accordance with the released power so as to form a short-circuit loop in the motor to stop the motor.

20 Claims, 4 Drawing Sheets

FAN SYSTEM AND STOPPING METHOD FOR MOTOR THEREOF

BACKGROUND OF THE INVENTION

1. Field of the Invention

The invention relates to a fan system, and more specifically to a fan system capable of stopping a motor thereof.

2. Description of the Prior Art

With increased functionality of electronic products, it is important to dissipate heat generated thereby. Typically, a fan system is utilized to dissipate heat from electronic products. When the power of the electronic product, which the fan system is applied to, is turned off, or no more power input into the fan system due to the separation from the electronic device physically, the motor of the fan system may continue to rotate due to inertia, which causes danger to users if they touch it. Further, resumption of power or reconnection of the fan to the electronic product causes a waiting time, which decreases efficiency.

FIG. 1 shows a fan system 1 having an energy storage apparatus 10, a small signal power 20, a driver 30, a motor 40 and a selecting device 50. The energy storage apparatus 10 is electrically connected to a power supply 2 which may be built into an electronic device and includes a storage capacitor $C_E$ for receiving power from the power supply 2. The small signal power 20 is electrically connected to the energy storage apparatus 10 for receiving power from the power supply 2 and converting accordingly to output converted power. The driver 30 is electrically connected to the small signal power 20 and receives power therefrom to generate a driving signal P so as to drive the motor 40. The motor 40 is electrically connected to the energy storage apparatus 10 for receiving power and the motor 40 is also electrically connected to the selecting device 50 so that the selecting device 50 determines whether to output the driving signal P to the motor 50. The driving signal P may be a pulse width modulation (PWM) signal generated by the driver 30 and allows the motor 40 to rotate when the driving signal P is input into the motor 40. Further, the fan system 1 has a first capacitor $C_1$ and a second capacitor $C_2$. One end of the first capacitor $C_1$ is electrically connected to the small signal power 20 and the other end thereof is electrically connected to ground. One end of the second capacitor $C_2$ is electrically connected to the energy storage apparatus 10 and the motor 40, and the other end thereof is electrically connected to ground.

The fan system 1 has a power path and a control path. From the energy storage apparatus 10 to the motor 40 via the second capacitor $C_2$ forms the power path, and from the energy storage apparatus 10 to the motor 40 via the small signal power 20, the driver 30 or the first capacitor $C_1$ forms the control path. When the fan system 1 receives power from the power supply 2, power is obtained to the motor 40 via the power path and the driving signal P for the motor is obtained via the control path. However, once the power supply 2 is turned off or the fan system 1 is separated from the power supply 2, no more power is obtained, and the storage capacitor $C_E$ of the energy storage apparatus 10 releases power into the control and power paths, so that the first capacitor $C_1$ and the driver 30 receive power released by the storage capacitor $C_E$. Then, the first capacitor $C_1$ generates a start-up signal S to the selecting device 50. The selecting device 50 outputs the start-up signal S to the motor 40 and forms a short-circuit loop in the motor 40, and thus an induction current is generated in a coil L of the motor 40 due to inertia after power disconnection so that a magnetic field in an inverse direction is generated to stop the inertia rotation of the motor 40.

However, in practice, when the storage capacitor $C_E$ releases power, the driver 30 also receives power to generate the driving signal P to the motor 40 at the same time. Since both the first capacitor $C_1$ and the driver 30 are on the control path, the timing input to the selecting device 50 and potential of the start-up signal S and the driving signal P are very close. Hence, the selecting device 50 may determine to select the driving signal P instead of the start-up signal S so that the stopping function for the motor 40 can not be performed normally.

Moreover, since the control path has two branches (through the first capacitor $C_1$ and the driver 30), the capacitance of the storage capacitor $C_E$ must be enough large so as to provide enough power to the power and control paths. However, this is more expensive and the production costs are increased.

BRIEF SUMMARY OF THE INVENTION

A detailed description is given in the following embodiments with reference to the accompanying drawings.

The invention provides a fan system, which has designs of providing a start-up signal to the motor at the power path so as to be separated from the driving signal at the control path. Thus, failure to stop the motor due to input of the driving signal and start-up of similar potential at the same time is avoided. Further, the energy storage apparatus does not require capacitors with high capacitance, so that the production costs are reduced.

An exemplary embodiment of a fan system is electrically connected to a power supply and receives the power from the power supply. The fan system includes an energy storage apparatus, a motor, a driver and a start-up device. The energy storage apparatus receives and stores power. The motor is electrically connected to the energy storage apparatus and receives the power. The driver is coupled between the energy storage apparatus and the motor to form a control path therewith and generates a driving signal to the motor according to received power. The start-up device is coupled between the energy storage apparatus and the motor to form a power path therewith. When no power is provided to the fan system, the energy storage apparatus releases the stored power and the start-up device generates a start-up signal to the motor in accordance with the released power so as to form a short-circuit loop and stops an operation of the motor.

Also, a stopping method for a fan system is provided. The fan system is electrically connected to a power supply and receives the power from the power supply. The fan system includes an energy storage apparatus, a motor, a driver and a start-up device. The energy storage apparatus is connected to the power supply and stores the power therefrom, the driver and the motor form a control path, and the start-up device and the motor form a power path. The stopping method includes steps of: providing the fan system; releasing the power from the energy storage apparatus when no power is provided to the fan system from the power supply; generating a start-up signal by the start-up device in accordance with the released power; and forming a short-circuit loop in response to the start-up signal and stopping an operation of the motor.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
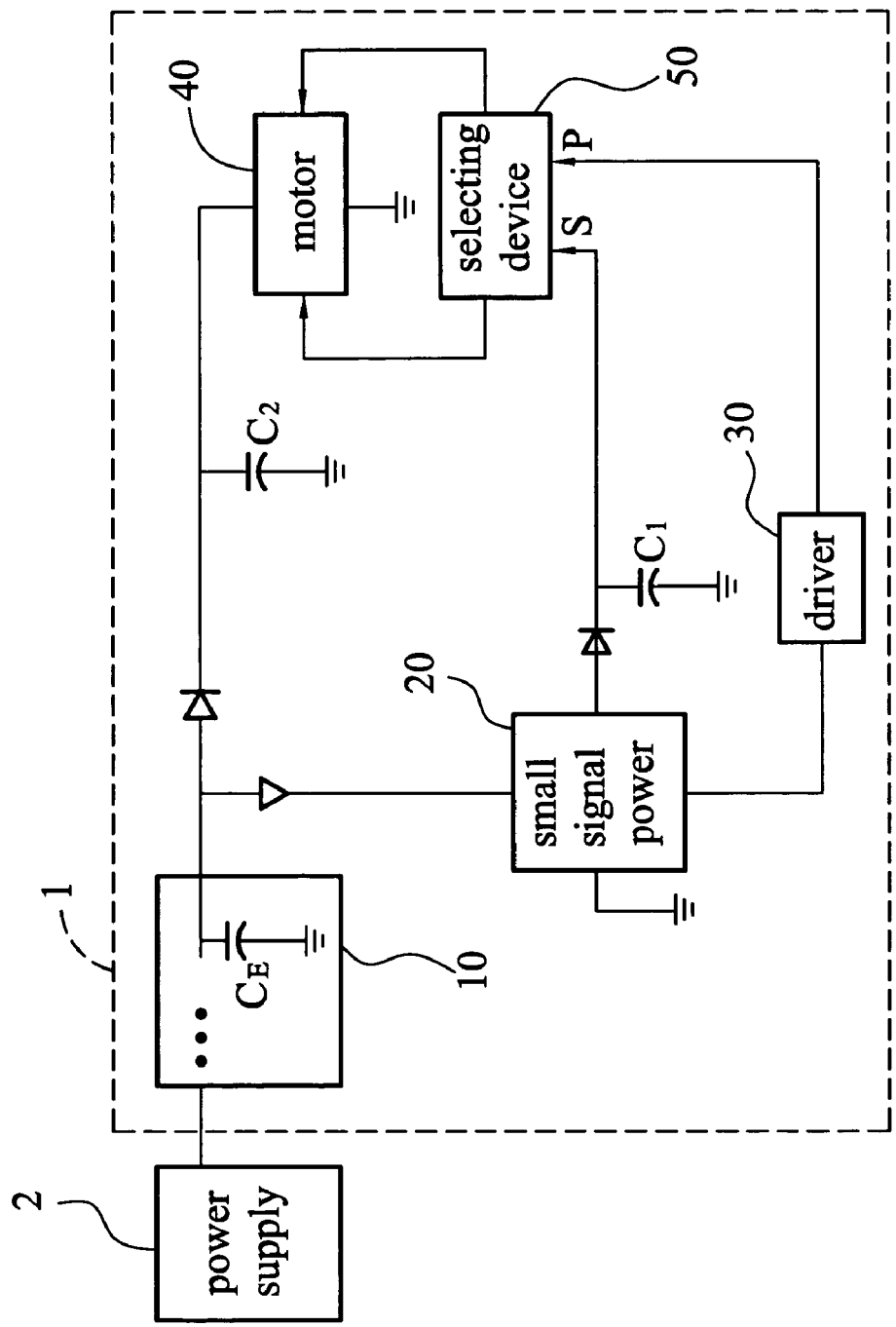
FIG. 1 is a schematic circuit diagram of a conventional fan system.
Figure 2:
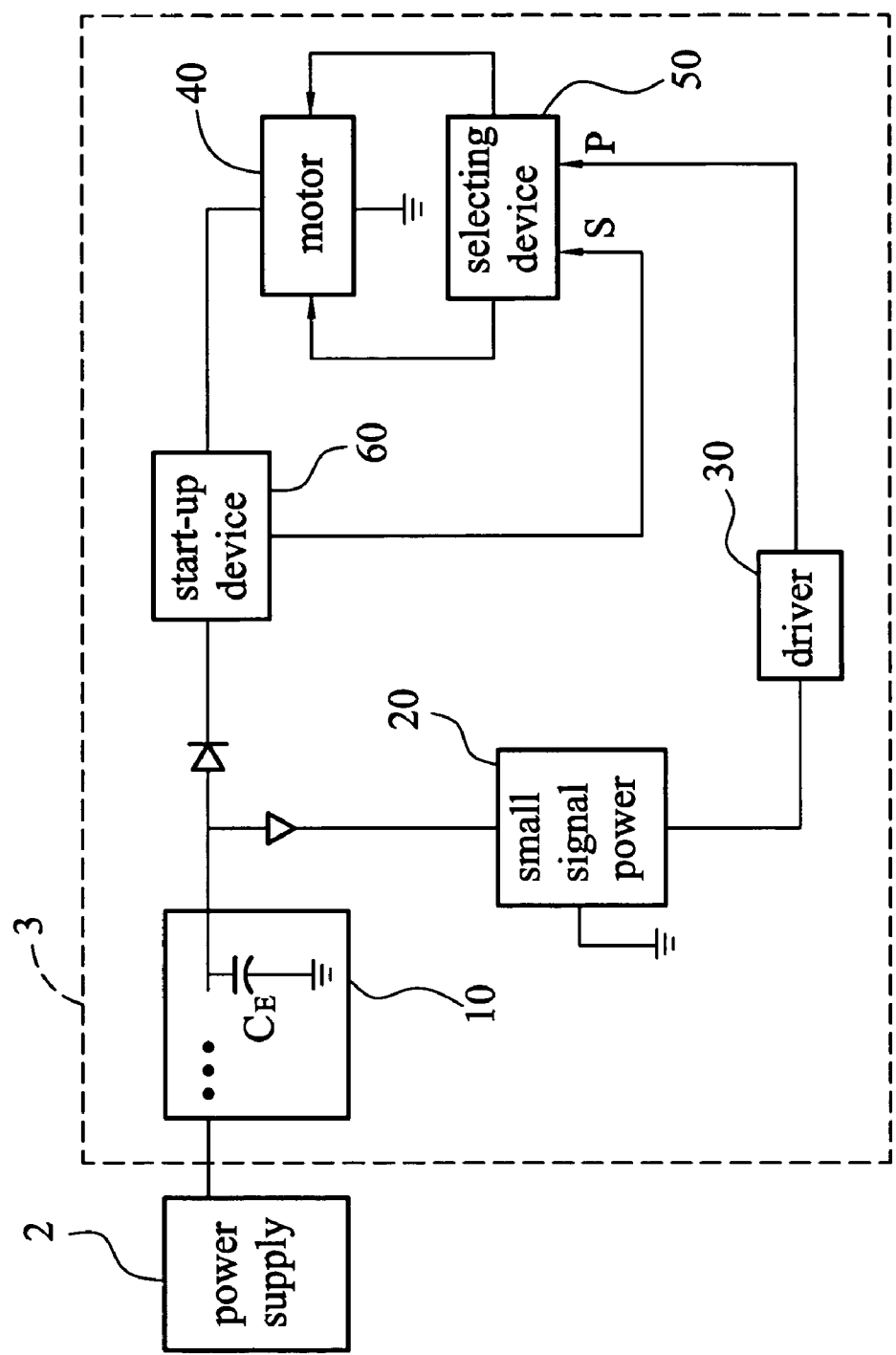
FIG. 2 is a schematic circuit diagram of a fan system according to the preferred an embodiment of the invention.

FIG. 2 is a schematic diagram of a fan system 3 according to the preferred embodiment of the invention. The fan system 3 is electrically connected to a power supply 2 and receives the power from the power supply 2. The fan system 3 includes an energy storage apparatus 10, a small signal power 20, a driver 30, a motor 40, a selecting device 50 and a start-up device 60. The energy storage apparatus 10 is electrically connected to the power supply 2 and receives the power from the power supply 2 and stores the power accordingly. As shown in FIG. 2, a storage capacitor $C_E$ may be used to store the power. The motor 40 is electrically connected to the energy storage apparatus 10 and receives the power from the energy storage apparatus 10. The driver 30 is electrically connected and is coupled between the energy storage apparatus 10 and the motor 40 so as to form a control path. The driver 30 also generates a driving signal P to the motor 40. The start-up device 60 is electrically connected and is coupled between the energy storage apparatus 10 and the motor 40 so as to form a power path. The start-up device 60 also generates a start-up signal S to the motor 40 according to received power. The small signal power 20 is electrically connected between the energy storage apparatus 10 and the driver 30 and receives the power from the energy storage apparatus 10 to convert the received power and output it to the driver 30. The selecting device 50 is electrically connected to the motor 40 and receives the driving signal P and the start-up signal S. Also, the selecting device 50 selects one of the driving signal P and the start-up signal S to be inputted into the motor 40

When the fan system 3 receives the power from the power supply 2, the motor 40 receives the power via the start-up device 60. Meanwhile, the selecting device 50 selects the driving signal P, which allows the motor 40 to operate with the speed thereof controlled by the driving signal P. In addition, the driving signal P may be a pulse width modulation (PWM) signal.

When no power is provided to the fan system 3 (e.g. the fan system 3 is separated from the power supply 2 or the power supply 2 is switched off), the energy storage apparatus 10 starts to release the power into the power path and the control path. Meanwhile, the start-up device 60 and the deriver 30 generate the start-up signal S and driving signal P, separately. Since the transmission at the power path is faster than the control path, the selecting device 50 receives the start-up signal S firstly and outputs the start-signal S to the motor 40 accordingly so as to form a short-circuit loop therein. Thus, the operation of the motor 40 can be stopped.

Figure 3:
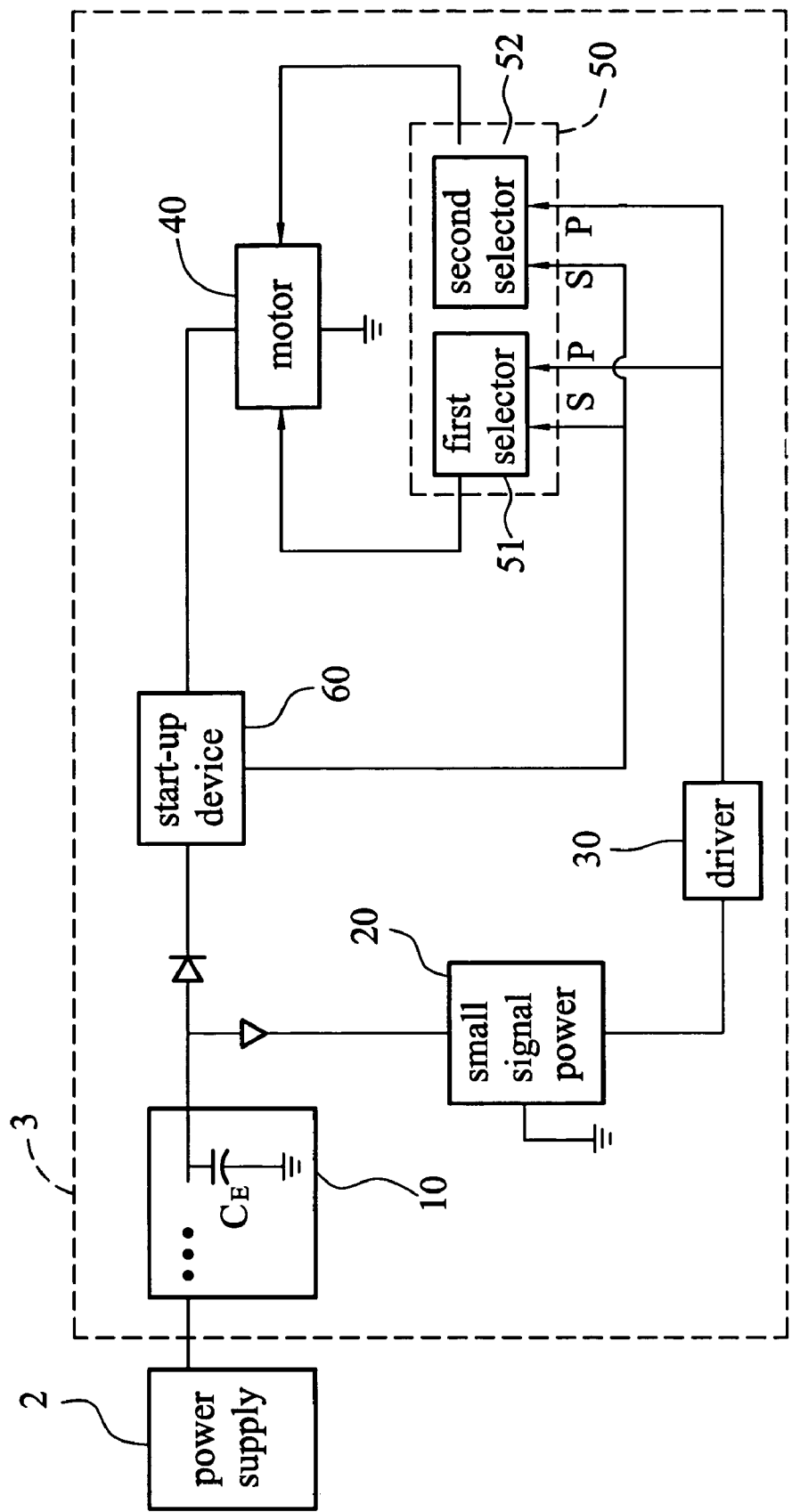
FIG. 3 is a schematic circuit diagram of the selecting device of the FIG. 2.

FIG. 3 is a schematic circuit diagram of the selecting device of the FIG. 2. The selecting device 50 includes a first selector 51 and a second selector 52. The first and second selectors 51 and 52 are electrically connected to the motor 40 and are both capable of receiving the start-up signal S or the driving signal P. When the first and second selectors 51 and 52 both receive the driving signal P, the motor 40 starts to operate. Conversely, when both of the first and second selectors 51 and 52 receive the start-up signal S, the motor 40 stops.

Figure 4:
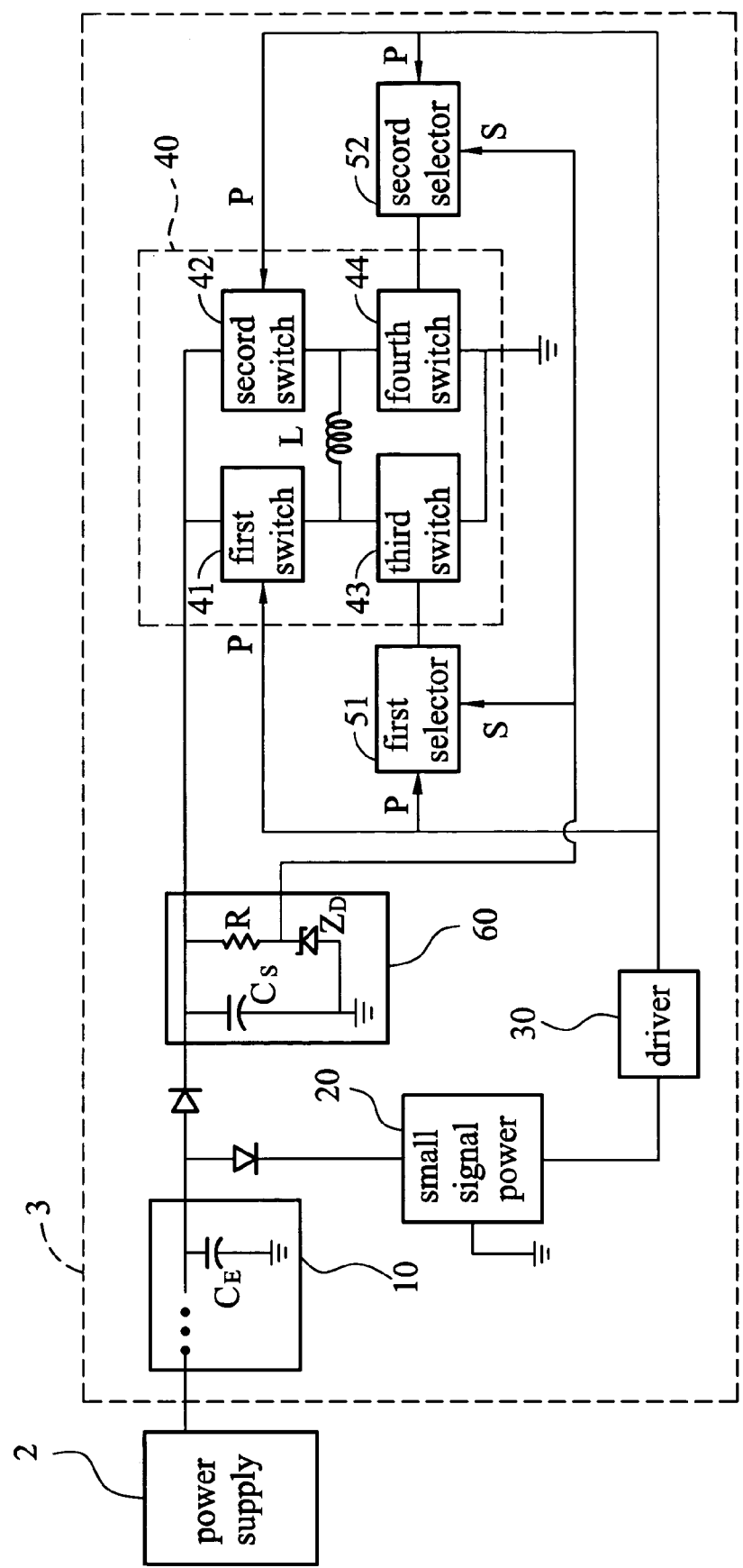
FIG. 4 is a schematic circuit diagram of the start-up device and motor of the FIG.

FIG. 4 is a schematic circuit diagram of the start-up device and motor of FIG. 3. The start-up device 60 includes a start-up capacitor $C_s$, a resistor R, and a Zener diode $Z_D$. One end the start-up capacitor $C_S$ is electrically connected to the energy storage apparatus 10 and the motor 40, and the other end of the start-up capacitor $C_s$ is electrically connected to ground. The resistor R is connected to the energy storage apparatus 10 and the motor 40 at one end and is electrically connected to one end of the Zener diode $Z_D$ at the other end. The other end of the Zener diode $Z_D$ is electrically connected to ground.

When no power is provided to the fan system 3, the energy storage apparatus 10 releases the power to the start-up capacitor $C_S$ which charges the resistor R and the Zener diode $Z_D$ accordingly and the start-up signal S is outputted between the resistor R and the Zener diode $Z_D$. In this case, the start-up signal S equals to the breakdown voltage of the Zener diode $Z_D$.

Moreover, as shown in FIG. 4, the motor 40 includes a first switch 41, a second switch 42, a third switch 43, a fourth switch 44 and a coil L (as a full-bridge arrangement). Both of the first and second switches 41 and 42 receives the driving signal P and the third and fourth switches 43 and 44 are electrically connected to the first and second selectors 51 and 52 respectively so that the third and fourth switches 43 and 44 can receive the driving signal P or the start-up signal via the first and second selectors 51.

When the fan system 3 receives the power from the power supply 2, the motor 40 obtains the power from the start-up device 60 and receives the driving signal P from the selecting device 50 so as to switch on/off the first switch 41, the fourth switch 44, the second switch 42 and the third switch 43. Thus, the current directions of the coil L alternately change, which drives the motor 40 to operate. However, when no power is provided to the fan system 3 (either when separated from power supply 2 or the power supply 2 is switched off), the energy storage apparatus 10 releases the power into the power path and the control path. Meanwhile, the start-up device 60 outputs the start-up signal S to the selecting device 50, so as to enable the first and second selectors 51 and t2 to output the start-up signal S to the third and fourth switches 43 and 44. Hence, the third and fourth switches 43 and 44 are turned on and are electrically connected to ground, so that a short-circuit loop with the coil L is formed. Thus, the operation of the motor 40 is stopped.

Further, the coil L generates a reverse electro-motive force when the short-circuit loop is formed and the current of the reverse electromotive force flows back to charge the start-up capacitor $C_s$. The energy of the resistor R and the Zener diode $Z_D$ obtained from the start-up capacitor $C_S$ is ensured. Thus, it is not necessary to use a storage capacitor $C_E$ with large capacitance as long as the power provided to the start-up device 60 and the start-up device 30 is ensured. Therefore, the production costs can be reduced.

According to the fan system of the invention, the start-up device is disposed at a power path so as to be separated from the driver at the control path. Thus, when no power is provided to the fan system from the power supply, the start-up device allows the motor to form a short-circuit loop so as to stop the motor. This improves the failure of a conventional stopping method and further has an advantage of using storage capacitors with small capacitance, so that the production costs can be reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fan system, electrically connected to a power supply for receiving power therefrom, the fan system comprising:
   an energy storage apparatus for receiving and storing power;
   a motor, electrically connected to the energy storage apparatus and receiving power;
   a driver, coupled between the energy storage apparatus and the motor to form a control path therewith and generating a driving signal to the motor according to received power; and
   a start-up device, coupled between the energy storage apparatus and the motor to form a power path therewith, wherein when no power is provided to the fan system, the energy storage apparatus releases stored power and the start-up device generates a start-up signal to the motor in accordance with the released power so as to form a short-circuit loop in the motor and stop an operation of the motor.

2. The fan system as claimed in claim 1, wherein the energy storage apparatus comprises a storage capacitor for receiving the power from the power supply and releasing the stored power into the power path and the control path when no power is provided to the fan system.

3. The fan system as claimed in claim 1, wherein the start-up device comprise a start-up capacitor for receiving and releasing the power from the energy storage apparatus and generating the start-up signal.

4. The fan system as claimed in claim 3, wherein the start-up device further comprises a resistor and a Zener diode, wherein a first end of the resistor and a first end of the start-up capacitor are both connected to the energy storage apparatus and the motor, a first end of the Zener diode is connected to a second end of the resistor, and a second end of the Zener diode and a second end of the start-up capacitor are both connected to ground.

5. The fan system as claimed in claim 4, wherein the start-up signal is output at the first end of the Zener diode, and the start-up signal equals the breakdown voltage of the Zener diode.

6. The fan system as claimed in claim 1, wherein the driver is a microprocessor or a programmable control chip.

7. The fan system as claimed in claim 1, further comprising a selecting device which is electrically connected to the motor for determining whether to output only the driving signal, only the start-up signal, or both to the motor.

8. The fan system as claimed in claim 7, wherein the motor comprises a plurality of switches and a coil, the selecting device is electrically connected to two of the switches, and when the selecting device determines to output the start-up signal to the motor, the two switches are turned on and form the short-circuit loop with the coil.

9. The fan system as claimed in claim 8, wherein the selecting device comprises a first selector and a second selector, and both of the first and second selectors receive the start-up signal and the driving signal and select either the start-up signal or the driving signal for inputting to the two switches.

10. The fan system as claimed in claim 1, wherein the driving signal is a pulse width modulation (PWM) signal.

11. A stopping method for a fan system, comprising steps of:
    providing the fan system, which is electrically connected to a power supply for receiving power therefrom and comprises an energy storage apparatus, a motor, a driver and a start-up device, wherein the energy storage apparatus is electrically connected to the power supply for storing power therefrom, the driver is coupled between the energy storage apparatus and the motor to form a control path, and the start-up device is coupled between the energy storage apparatus and the motor to form a power path therewith;
    releasing the power from the energy storage apparatus;
    the start-up device generating a start-up signal in accordance with the released power; and
    forming a short-circuit loop in the motor in response to the start-up signal and stopping an operation of the motor.

12. The stopping method as claimed in claim 11, wherein the start-up signal is a voltage signal.

13. The stopping method as claimed in claim 11, wherein the energy storage apparatus comprises a storage capacitor for receiving the power from the power supply and releasing the stored power into the power and control paths when no power is provided to the fan system.

14. The stopping method as claimed in claim 11, wherein the start-up device comprises a start-up capacitor for receiving and releasing the power from the energy storage apparatus and generating the start-up signal.

15. The stopping method as claimed in claim 14, wherein the start-up device further comprises a resistor and a Zener diode, wherein a first end of the resistor and a first end of the start-up capacitor are both connected to the energy storage apparatus and the motor, a first end of the Zener diode is connected to a second end of the resistor, and a second end of the Zener diode and a second end of the start-up capacitor are both connected to ground.

16. The stopping method as claimed in claim 15, wherein the start-up signal is output at the first end of the Zener diode, and the start-up signal equals the breakdown voltage of the Zener diode.

17. The stopping method as claimed in claim 11, wherein the driver is a microprocessor or a programmable control chip.

18. The stopping method as claimed in claim 11, wherein the fan system further comprises a selecting device which is electrically connected to the motor for determining to output only the driving signal, only the start-up signal or both to the motor.

19. The stopping method as claimed in claim 18, wherein the motor comprises a plurality of switches and a coil, the selecting device is electrically connected to two of the switches, and when the selecting device determines to output the start-up signal to the motor, the two switches are turned on and form the short-circuit loop with the coil.

20. The stopping method as claimed in claim 19, wherein the selecting device comprises a first selector and a second selector, and both of the first and second selectors receive the start-up signal and the driving signal and select either the start-up signal or the driving signal for inputting to the two switches.

* * * * *